(12) United States Patent
Park

(10) Patent No.: US 7,430,031 B2
(45) Date of Patent: Sep. 30, 2008

(54) LIQUID CRYSTAL DISPLAY DEVICE AND METHOD OF FABRICATING THE SAME

(75) Inventor: Jong Sub Park, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 278 days.

(21) Appl. No.: 11/171,853

(22) Filed: Jun. 29, 2005

(65) Prior Publication Data
US 2006/0001810 A1    Jan. 5, 2006

(30) Foreign Application Priority Data
Jun. 30, 2004    (KR) ...................... 10-2004-0050545

(51) Int. Cl.
*G02F 1/1337* (2006.01)
(52) U.S. Cl. ..................................... 349/129
(58) Field of Classification Search ................. 349/129, 349/128
See application file for complete search history.

(56) References Cited

U.S. PATENT DOCUMENTS

| | | | | |
|---|---|---|---|---|
| 4,759,610 A | * | 7/1988 | Yanagisawa | ................ 349/162 |
| 5,850,274 A | * | 12/1998 | Shin et al. | ................... 349/129 |
| 5,880,798 A | * | 3/1999 | Walton et al. | ................. 349/99 |
| 6,040,885 A | * | 3/2000 | Koike et al. | ................. 349/129 |

OTHER PUBLICATIONS

First Office Action for corresponding Chinese Patent Application Serial No. 200510082438.X, dated Aug. 24, 2007.

* cited by examiner

*Primary Examiner*—Richard H Kim
(74) *Attorney, Agent, or Firm*—Brinks Hofer Gilson & Lione

(57) ABSTRACT

A method of fabricating an array substrate for an LCD (liquid crystal display device) is presented in which each pixel region contains multi-domain regions. The method includes: forming a first alignment layer by coating a first alignment material on an LCD substrate; forming a photoresist pattern on the first alignment layer; removing the first alignment layer exposed by the photoresist pattern; forming a second alignment layer by coating a second alignment material on the substrate; removing the photoresist pattern to lift off the second alignment layer formed on the photoresist pattern; and rubbing the first alignment layer and the second alignment layer in a predetermined direction. The first and second alignment layers are formed from different materials and have different alignment directions.

13 Claims, 5 Drawing Sheets

US 7,430,031 B2

LIQUID CRYSTAL DISPLAY DEVICE AND METHOD OF FABRICATING THE SAME

PRIORITY CLAIM

This application claims the benefit of Korean Patent Application No. 2004-50545 filed on Jun. 30, 2004, which is hereby incorporated by reference.

FIELD OF THE INVENTION

The present invention relates to a liquid crystal display device (LCD), and more particularly, to a multi-domain array substrate for an LCD and a method of fabricating the same.

DESCRIPTION OF THE RELATED ART

A cathode ray tube (CRT) has been widely used for displaying an image on its screen. The CRT is, however, inconvenient to use because it is large and heavy for its display area.

With the development of electronic industries, a display device that has been limited to a TV display is now applicable to various fields, such as personal computers, laptops, wireless terminals, car dashboards, and electronic display boards. Additionally, since the rapid development of the information and communication technology makes it possible to transmit high-capacity image information, there is an increasing demand for next-generation display devices that can process mass image information.

A liquid crystal display device (LCD) is considered as the next-generation display device because it has many advantages, including a lightweight, a slim profile, a high brightness, a large screen, a low power consumption, and a low price. The LCD has higher resolution than other flat display devices. Also, when displaying a moving picture, the LCD has a response speed comparable to the CRT. The LCD has good characteristics of high brightness, high contrast, and low power consumption and is extensively used in a field of a desktop computer monitor, a notebook computer monitor, a TV receiver, a navigation screen, and so on.

A Twisted Nematic (TN) mode LCD is mainly used. The TN mode LCD includes a top substrate, a bottom substrate, and a liquid crystal layer interposed therebetween. The liquid crystal layer contains liquid crystal molecules. A director at a lower portion and a director at an upper portion form a right angle by performing an alignment process on a plane of the substrate contacting with the liquid crystal layer.

In the TN mode LCD, when no electric field is applied, the liquid crystal molecules filled between two substrates are arranged parallel to the substrate, have a constant pitch, and the liquid crystal molecules are spirally twisted. Consequently, directions of major axes of the liquid molecules are continuously twisted.

These liquid crystal devices are required to be more powerful to keep pace with the recent multimedia generation. Under this circumstance, several technologies for wide viewing angle have been developed, but have side effects such as an increase in power consumption and loss of display quality, as well as influencing the manufacturing process, which are accompanied by deterioration of the opening ratio.

A multi-domain technology of providing different structures in one pixel cell has been proposed, which has focused on alignment of the liquid crystal molecules to ensure a wide viewing angle. More particularly, the region where liquid crystal molecules having the same alignment direction exist is called a domain. In a multi-domain LCD, a plurality of liquid crystal molecules are aligned in different directions within one pixel cell. If one pixel cell has a plurality of domains, alignments of the liquid crystals in each domain are different form each other, thereby providing a wide viewing angle.

A rubbing process for processing the alignment layer to make liquid crystal molecules uniformly aligned in a constant direction is a major factor in determining a normal operation of an LCD and a uniform display characteristic of a screen. Accordingly, much research has been performed on the rubbing process.

A method of fabricating a multi-domain alignment layer will be described in detail with reference to FIG. 1.

The multi-domain alignment layer is formed by coating a high molecular thin film, dividing an alignment layer, and aligning the alignment layer in different directions. In general, the alignment layer is formed of polyimide-based organic material using a rubbing process.

In forming the polyimide alignment layer, polyimide-based organic material is coated on a substrate and a solvent is removed at about 60-80° C. Then, the alignment layer is cured at about 80-200° C. Next, an alignment direction is formed by rubbing the alignment layer in a predetermined direction by using a rubbing cloth such as velvet.

FIGS. 1A to 1E are cross-sectional views illustrating a method of forming a multi-domain alignment layer.

Referring to FIG. 1A, an organic layer is coated on a substrate 101 and a first alignment layer 103 is rubbed to the right on the drawing, to thereby make the first alignment layer 103 have a right alignment direction.

Referring to FIG. 1B, a positive photosensitive resin layer 105 is coated on the first alignment layer 103.

Referring to FIG. 1C, a predetermined portion of the photosensitive resin layer 105 is covered using a mask. Then, the photosensitive resin layer 105 is exposed to light. Then, photolithography is performed to etch the photosensitive resin layer 105 using a developer, thereby forming a predetermined photosensitive resin pattern.

Referring to FIG. 1D, the resulting structure is rubbed to the left to align the exposed areas in a left alignment direction.

Referring to FIG. 1E, the photosensitive resin layer 105 is removed to form a multi-domain alignment layer.

However, since the multi-domain alignment layer is formed using photolithography, the fabricating method is complex. Also, the alignment layer is damaged by the developer and etchant used in the photolithographic process, so that the alignment layer is unstable. Additionally, since the alignment layer may be damaged by the mask, the alignment characteristic is deteriorated, resulting in degradation of the picture quality.

SUMMARY OF THE INVENTION

By way of introduction only, an array for an LCD and a method of fabricating the same is provided in which multi-domains can be implemented through a one-time rubbing by using alignment layers arranged parallel and perpendicular to a rubbing direction, thereby providing a wide viewing angle.

In one aspect, an array substrate for an LCD (liquid crystal display device), includes: a plurality of gate lines formed on a substrate; a plurality of data lines intersected with the gate lines to define a pixel region; a switch formed at an intersection of the gate lines and the data lines; a pixel electrode formed in the pixel region and electrically connected to the switch; and a plurality of individual alignment layers having different alignment characteristics formed in the pixel region such that multi-domain regions are formed in the pixel region.

In another aspect, an array substrate for an LCD (liquid crystal display device) comprises: a plurality of gate lines formed on a substrate; a plurality of data lines intersecting the gate lines to define a pixel region; and a plurality of individual alignment layers in the pixel region. The alignment layers are formed from different materials and have different alignment directions.

In another aspect of the present invention, there is provided a method of fabricating an array substrate for an LCD (liquid crystal display device). The method comprises: forming a first alignment layer by coating a first alignment material on a substrate; forming a photoresist pattern on the first alignment layer; forming a second alignment layer by coating a second alignment material on the substrate; removing the photoresist pattern to lift off the second alignment layer formed on the photoresist pattern; and rubbing the first alignment layer and the second alignment layer in a predetermined direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
FIGS. 1A to 1E are cross-sectional views of processes of forming an alignment layer with a related art multi-domain structure.
Figure 1B:
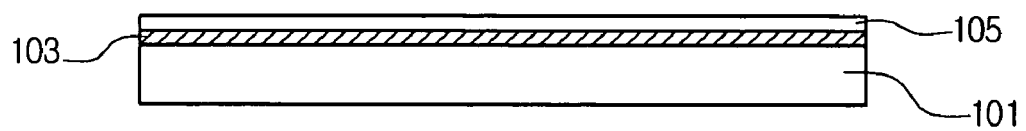
Figure 1C:
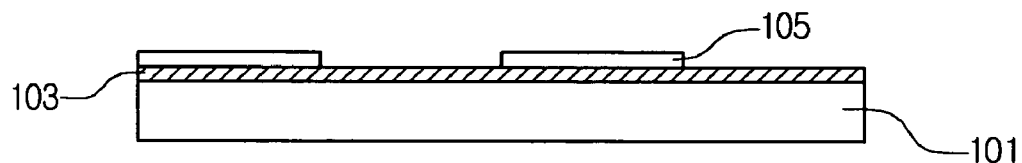
Figure 1D:
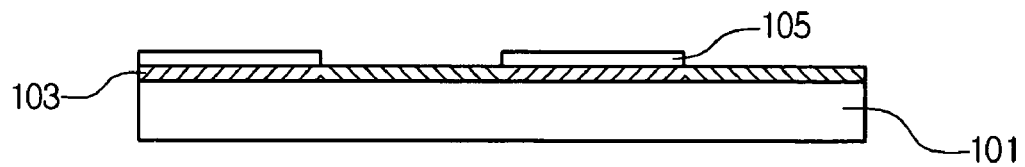
Figure 1E:
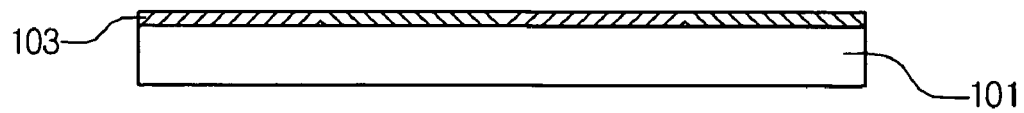
Figure 2:
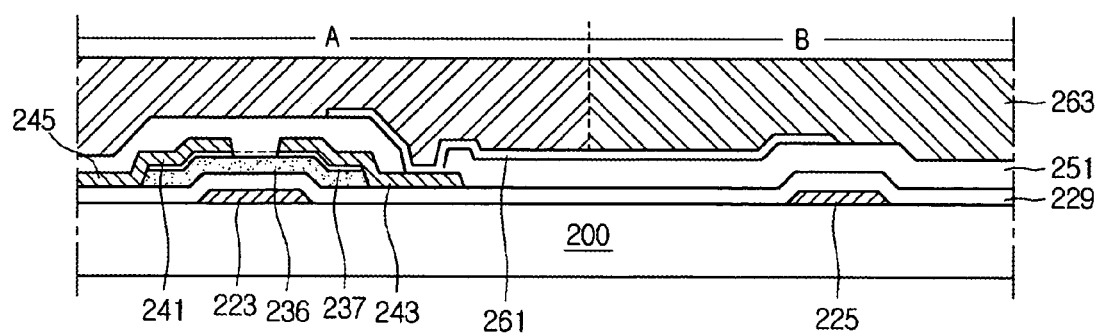
FIG. 2 is a cross-sectional view of one pixel in an array for an LCD according to a preferred embodiment of the present invention.

FIG. 2 is a cross-sectional view of one pixel in an array for an LCD according to a preferred embodiment of the present invention.

Referring to FIG. 2, a gate electrode 223 and a gate line 225 are formed on a substrate 200. The gate electrode 223 and the gate line 225 are formed of a single layer or a double layer. That is, the gate electrode 223 and the gate line 225 are formed of one or two materials selected from the group consisting of Al, an Al alloy, Mo, Cr, and W.

A gate insulating layer 229 is formed on an entire surface of the substrate 200 in which the gate electrode 223 and the gate line 225 are formed. An active layer 236 and an ohmic contact layer 237 are formed on the gate insulating layer 229 above the gate electrode 223.

A source electrode 241 and a drain electrode 243 are formed in contact with the ohmic contact layer 237, and data line (not shown) is formed to be connected with the source electrode 241. The source electrode 241 and the drain electrode 243 are formed spaced apart from each other by a predetermined distance. The ohmic contact layer 237 exposed to the gap between the source electrode 241 and the drain electrode 243 is removed to thereby expose the active layer 236. The source electrode 241 and the drain electrode 243 are formed by patterning a layer that is formed of a conductive metal selected from the group consisting of Al, an Al alloy, Mo, Cr, and W by using a deposition process.

A passivation layer 251 is formed on an entire surface of the substrate 200 where the source electrode 241 and the drain electrode 243 are formed. The passivation layer 251 is formed by depositing an inorganic insulating material such as silicon nitride and silicon oxide. In some cases, the passivation layer 251 is formed of an organic insulating material such as benzocyclobutene (BCB) or an acryl-based resin.

The passivation layer 251 is patterned to form a drain contact hole exposing a portion of the drain electrode 243. A transparent pixel electrode 261 contacting the drain electrode 243 is formed on an entire surface of the resulting structure by depositing a transparent conductive metal such as indium tin oxide (ITO) and indium zinc oxide (IZO).

Next, an alignment layer 263 is by coating an alignment material on an entire surface of the substrate 200 where the transparent pixel electrode 261 is formed. The alignment layer 263 is divided into a region A and a region B. The region A and the region B correspond to half of a unit pixel and form two domains. The invention is not limited to the two domains and the alignment layer 263 can be divided into more than two regions.

The region A and the region B of the alignment layer 263 are formed of alignment materials having different alignment characteristics. For example, the alignment layer 263 of the region A is formed of an alignment material arranged parallel to a rubbing direction, while the alignment layer 263 of the region B is formed of an alignment material arranged perpendicular to the rubbing direction. The alignment layer 263 having the region A and the region B is formed to have different alignment characteristics with respect to one rubbing direction. That is, the alignment layer 263 comprises individual alignment layers that are provided at different times and have different alignment characteristics, rather than being formed from a single material at the same time and subsequently processed differently.

FIGS. 3A to 3D are cross-sectional views of processes of forming a multi-domain alignment layer according to an embodiment of the present invention. FIG. 4 is a plan view of a rubbing direction and an alignment direction of a liquid crystal cell according to an embodiment of the present invention.

Figure 3A:
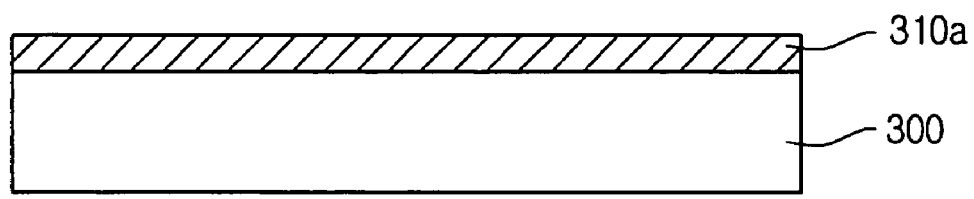
FIGS. 3A to 3D are cross-sectional views of processes of forming an alignment layer with a multi-domain structure according to an embodiment of the present invention.
Figure 4:
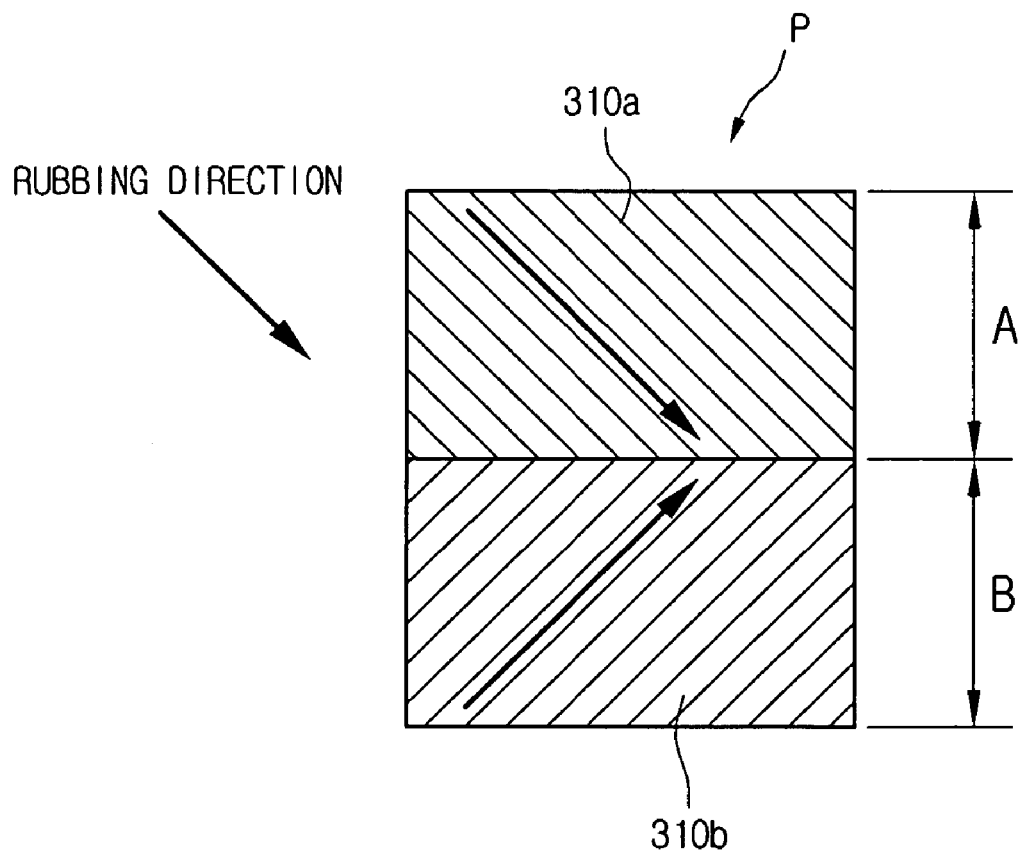
FIG. 4 is a plan view of a rubbing direction and an alignment direction in a liquid crystal cell according to an embodiment of the present invention.

Referring to FIG. 3A, a first alignment layer 310a is formed on an entire surface of a substrate 300. The first alignment layer 310a can be coated using a transferring method, a bar-coating method or a spinning method.

Figure 3B:
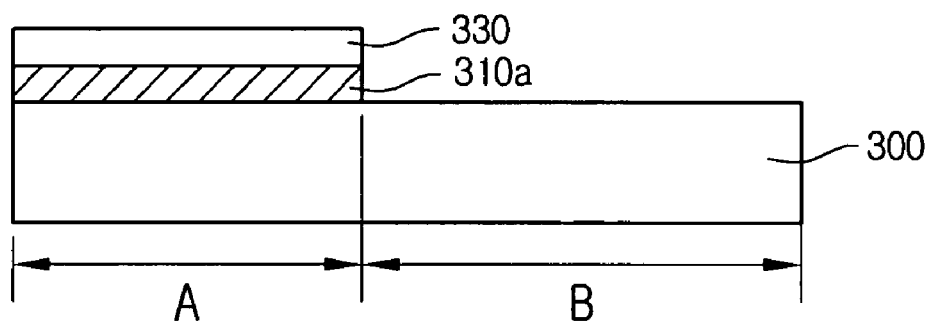

Referring to FIG. 3B, a positive photosensitive resin layer is formed on the first alignment layer 310a. A predetermined portion of the photosensitive resin layer is covered using a photo mask. Then, the photosensitive resin layer is exposed to light and thus is hardened. Then, photolithography is performed to etch the photosensitive resin layer using a developer, thereby forming a predetermined photosensitive resin pattern 330.

The exposed region B is removed using the photosensitive resin pattern 330 as a mask, while leaving the region A of the first alignment layer 310a. The region A and the region B correspond to half of the unit pixel P.

Figure 3C:
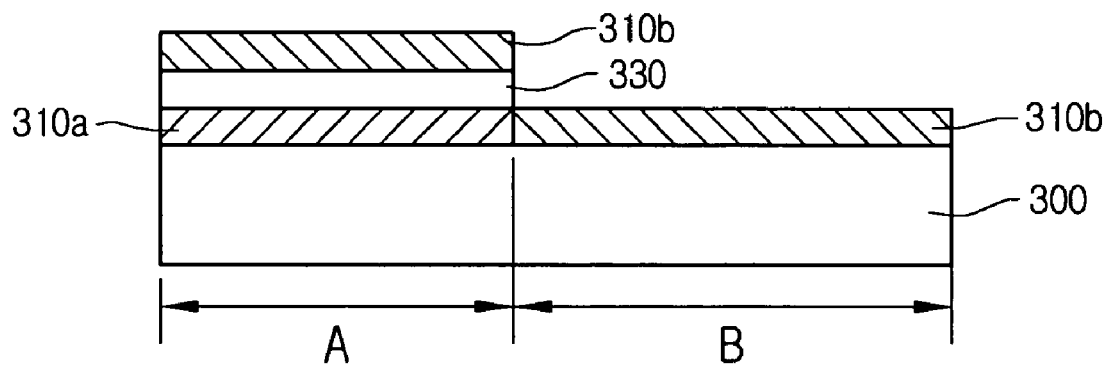

Referring to FIG. 3C, a second alignment layer 310b is formed on the photosensitive resin pattern 330 where the first alignment layer 310a is formed. That is, the second alignment layer 310b is formed on the photosensitive resin pattern 330 of the region A and the substrate 300 of the region B. Accordingly, when the photosensitive resin pattern 330 is removed, the second alignment layer 310b formed in the A region is lifted off and removed. Consequently, the first and second alignment layers 310a and 310b having different characteristics are formed on the substrate 300. The first alignment layer 310a is formed of a material that is arranged parallel to the rubbing direction and the second alignment layer 310b is formed of a material that is arranged perpendicular to the rubbing direction.

Figure 3D:
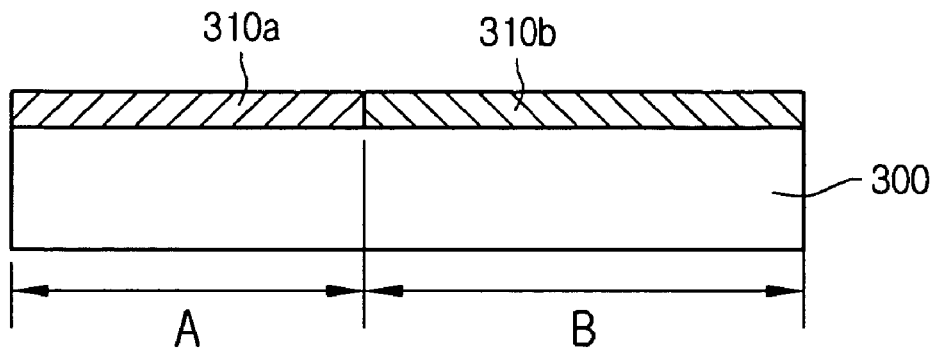

Referring to FIG. 3D, the substrate 300 where the first and second alignment layers 310a and 310b are formed with two domains per one pixel P is cured and rubbed in one direction. As a result, as shown in FIG. 4, an alignment direction of the first alignment layer 310a is parallel to the rubbing direction, while an alignment direction of the second alignment layer 310b is perpendicular to the rubbing direction.

As described above, two domains can be defined in the one pixel P through the above sequential procedures. In the multi-domain LCD, the multi-domains can be formed using plurality of liquid crystal molecule groups, which are arranged in different directions in one pixel cell. Because the alignments of the liquid crystals are different in each domain, the viewing angle can be improved remarkably.

Figure 5:
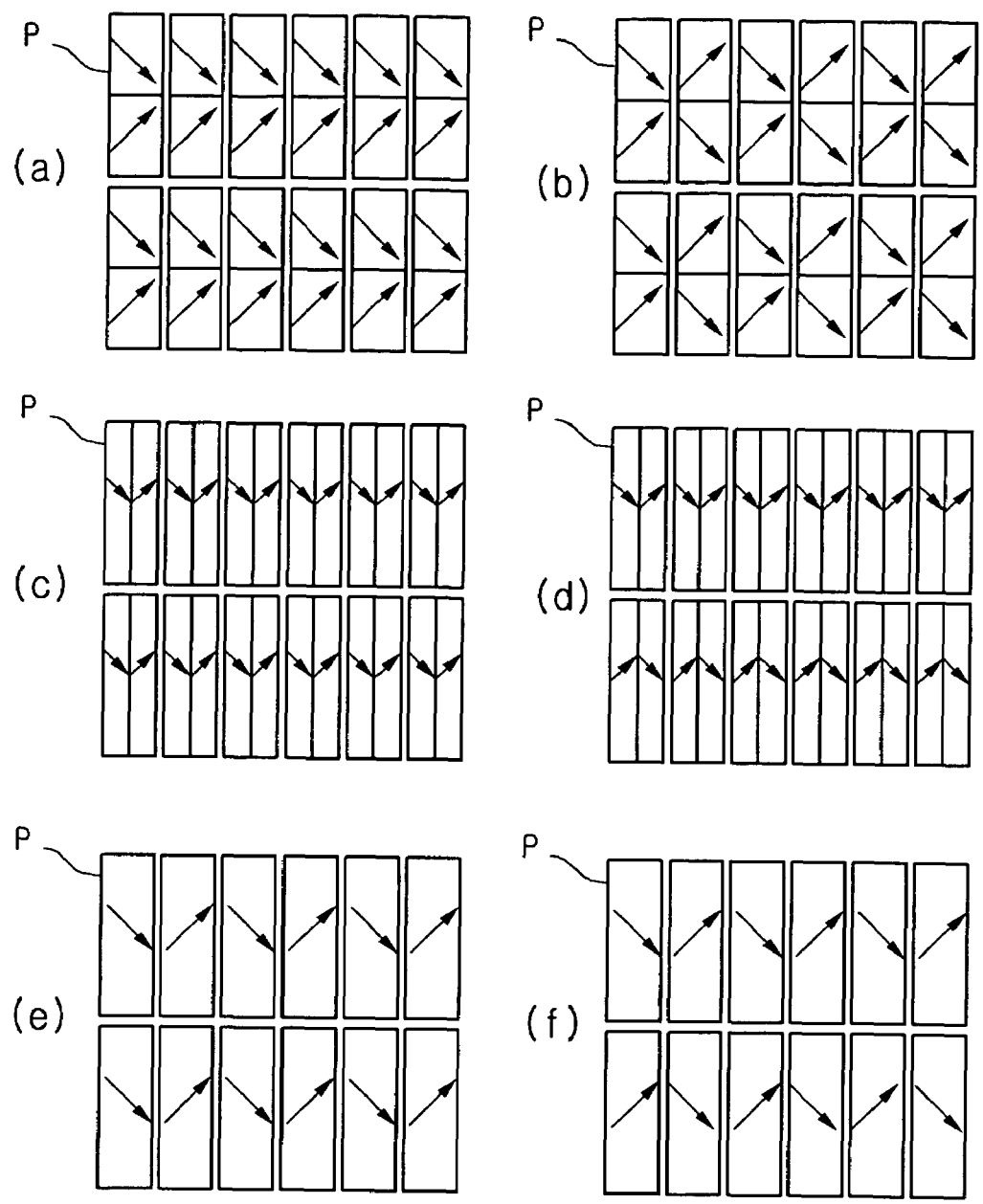
FIGS. 5(a)-(f) are schematic views of alignment layers with a multi-domain formed of two different kinds of alignment materials according to other embodiments of the present invention.

FIG. 5 are schematic views of a multi-domain alignment layer formed of different kinds of alignment materials according to other embodiments of the present invention.

Referring to FIG. 5, a multi-domain is formed using a first alignment material arranged parallel to a rubbing direction and a second alignment material arranged perpendicular to a rubbing direction. The first alignment material includes polyimide and the second alignment material includes polystyrene.

As shown in FIGS. 5(a) and 5(b), one pixel P is divided into an upper portion and a lower portion, which are formed of alignment materials having different alignment characteristics. Accordingly, two domains are defined by one rubbing.

As shown in FIGS. 5(c) and 5(d), one pixel P is divided into a left portion and a right portion, which are formed of alignment materials having different alignment characteristics. Accordingly, two domains are defined by one rubbing.

As shown in FIGS. 5(e) and 5(f), a pixel P and an adjacent pixel are formed of an alignment layer having alignment material having different characteristics. Accordingly, it is possible to form the multi-domain having different alignment directions within one pixel.

In the LCD according to the present invention, two domains can be defined within one pixel through a one-time rubbing by using different kinds of alignment materials having different alignment characteristics, thereby reducing a processing time and improving yield of the product. Additionally, since multi-domains can be formed in one pixel, it is possible to provide a wide viewing angle and an improved picture quality.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An array substrate for an LCD (liquid crystal display device), comprising:
    a plurality of gate lines formed on a substrate;
    a plurality of data lines intersected with the gate lines to define a pixel region;
    a switch formed at an intersection of the gate lines and the data lines;
    a pixel electrode formed in the pixel region and electrically connected to the switch; and
    a plurality of individual alignment layers having different alignment characteristics formed in the same layer and in the pixel region such that multi-domain regions are formed in the pixel regions,
    wherein the alignment layers are formed from different materials.

2. The array substrate according to claim 1, wherein the alignment layers have different alignment directions.

3. The array substrate according to claim 2, wherein an alignment direction of at least one of the alignment layers is parallel to a rubbing direction.

4. The array substrate according to claim 2, wherein an alignment direction of at least one of the alignment layers is perpendicular to a rubbing direction.

5. The array substrate according to claim 3, wherein an alignment direction of at least one of the alignment layers is perpendicular to the rubbing direction.

6. The array substrate according to claim 2, wherein alignment directions of adjacent alignment layers are perpendicular to each other.

7. The array substrate according to claim 6, wherein the alignment direction of one of the adjacent alignment layers is parallel to a rubbing direction.

8. An array substrate for an LCD (liquid crystal display device), comprising:
    a plurality of gate lines formed on a substrate;
    a plurality of data lines intersecting the gate lines to define a pixel region; and
    a plurality of individual alignment layers in the same layer and in the pixel region, the alignment layers formed from different materials and having different alignment directions.

9. The array substrate according to claim 8, wherein the alignment direction of at least one of the alignment layers is parallel to a rubbing direction.

10. The array substrate according to claim 9, wherein the alignment direction of at least one of the alignment layers is perpendicular to the rubbing direction.

11. The array substrate according to claim 8, wherein the alignment direction of at least one of the alignment layers is perpendicular to a rubbing direction.

12. The array substrate according to claim 8, wherein the alignment directions of adjacent alignment layers are perpendicular to each other.

13. The array substrate according to claim 12, wherein the alignment direction of one of the adjacent alignment layers is parallel to a rubbing direction.

* * * * *